US010070595B2

(12) United States Patent
Loebinger et al.

(10) Patent No.: US 10,070,595 B2
(45) Date of Patent: Sep. 11, 2018

(54) DRIP IRRIGATION TUBE HAVING DOSING ELEMENTS INSERTED THEREIN

(71) Applicant: THE Machines Yvondand S.A., Yvonand (CH)

(72) Inventors: Ahai Loebinger, Yvonand (CH); Eberhard Kertscher, Yvonand (CH)

(73) Assignee: THE MACHINES YVONAND S.A., Yvonand (CH)

( * ) Notice: Subject to any disclaimer, the term of this patent is extended or adjusted under 35 U.S.C. 154(b) by 19 days.

(21) Appl. No.: 14/931,530

(22) Filed: Nov. 3, 2015

(65) Prior Publication Data

US 2017/0118927 A1 May 4, 2017

(51) Int. Cl.
*A01G 25/02* (2006.01)

(52) U.S. Cl.
CPC .................. *A01G 25/023* (2013.01)

(58) Field of Classification Search
CPC .......... A01G 25/02; A01G 25/023; A01G 2025/006; Y02A 40/237
USPC ....... 239/104, 106, 107, 553.1, 553.13, 566, 239/567, 542, 547; 285/13, 14; 405/36, 405/42, 49
See application file for complete search history.

(56) References Cited

U.S. PATENT DOCUMENTS

| | | | | |
|---|---|---|---|---|
| 4,430,020 A * | 2/1984 | Robbins | ............. | A01G 25/02 138/170 |
| 5,207,386 A * | 5/1993 | Mehoudar | ............. | A01G 25/023 138/42 |
| 5,333,793 A * | 8/1994 | DeFrank | ............. | A01G 25/02 239/533.1 |
| 5,615,838 A * | 4/1997 | Eckstein | ............. | A01G 25/023 239/533.1 |
| 5,636,797 A * | 6/1997 | Cohen | ............. | G05D 7/0113 239/542 |
| 5,829,685 A * | 11/1998 | Cohen | ............. | A01G 25/023 239/533.1 |
| 6,382,530 B1* | 5/2002 | Perkins | ............. | A01G 25/023 239/533.1 |
| 7,735,758 B2 * | 6/2010 | Cohen | ............. | A01G 25/023 239/533.1 |
| 2003/0150940 A1 | 8/2003 | Vildibill et al. | | |

FOREIGN PATENT DOCUMENTS

| | | |
|---|---|---|
| WO | 0204130 A1 | 1/2002 |
| WO | 20120137200 A1 | 10/2012 |
| WO | 20120158462 A1 | 11/2012 |
| WO | 2014016832 A1 | 1/2014 |

* cited by examiner

*Primary Examiner* — Chee-Chong Lee
(74) *Attorney, Agent, or Firm* — Dorsey & Whitney LLP

(57) ABSTRACT

In the case of a drip irrigation tube the dosing elements which are inserted therein and are connected to the walling of the drip irrigation tube each comprise inlet regions, dosing regions and outlet regions, through which the water issues out of the drip irrigation tube via outlet openings installed in the tube walling. The outlet openings are in the form of a slit, the edge regions of the slit are supported by supporting means in such a manner as to limit bending of the edge regions of the slit towards the dosing elements. As a consequence, when negative pressure prevails in the tube contaminants are prevented from being able to penetrate through the slits into the dosing elements and block same.

9 Claims, 15 Drawing Sheets p < 0

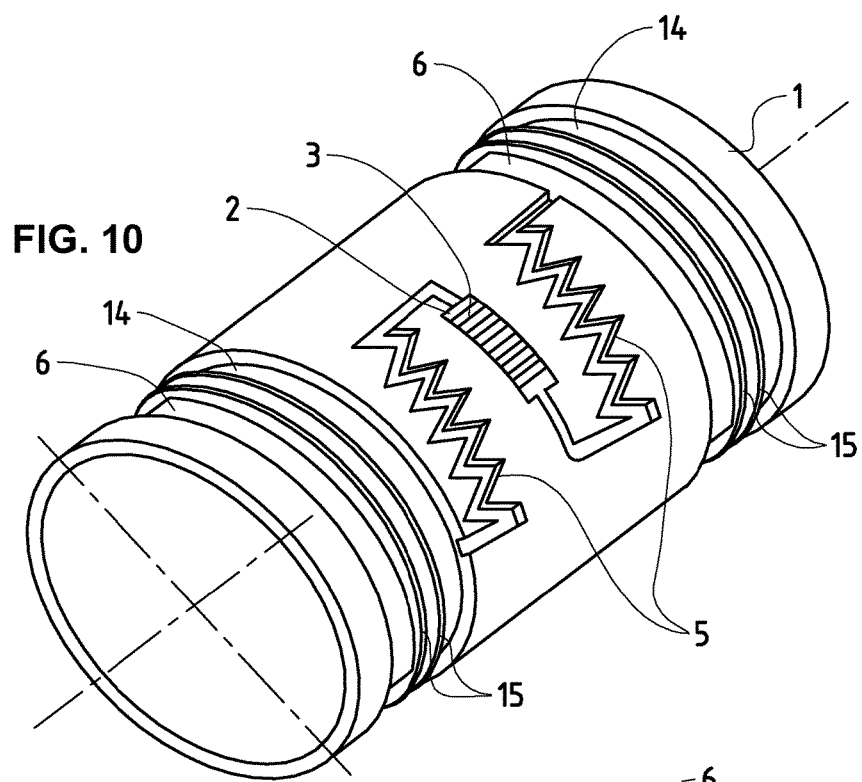
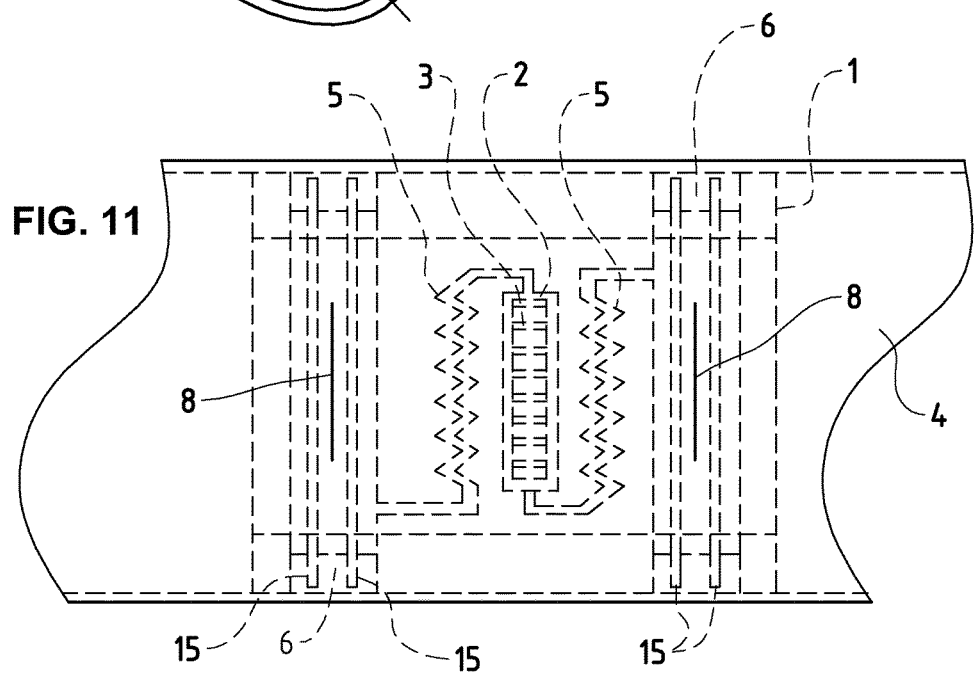

DRIP IRRIGATION TUBE HAVING DOSING ELEMENTS INSERTED THEREIN

CROSS-REFERENCE TO RELATED PATENT APPLICATIONS

The present application is related to European Patent Application No. 14171417.8, filed on Jun. 6, 2014. The entirety of which is hereby incorporated by reference.

BACKGROUND

The present invention relates to a drip irrigation tube having dosing elements which are inserted therein and are connected to the walling of the drip irrigation tube, which dosing elements each comprise inlet regions—through which the water passes from the tube into the dosing elements—dosing regions, in which the pressure of the through-flowing water is reduced, and outlet regions through which the water issues out of the drip irrigation tube via outlet openings installed in the tube walling.

Such drip irrigation tubes are known in many forms. They are used in particular for directly irrigating plants. For this purpose, in the region of each plant the tube can have at least one dosing element installed therein, by means of which the water is emitted dropwise via an outlet opening and the respective plant is irrigated. Such drip irrigation tubes ensure that the water can be used very sparingly and efficiently.

During the irrigation procedure, the water in the drip irrigation tubes is subjected to a specific pressure. By reducing the pressure in the dosing regions of the dosing elements, the water issues dropwise out of the drip irrigation tubes through the outlet openings. If the irrigation via the drip irrigation tubes is interrupted or stopped, the pressure of the water in the drip irrigation tubes reduces. Since the drip irrigation tubes follow, over their lengths in the cultures to be irrigated, the unevenness or inclinations of the soil, the water located in the drip irrigation tubes will run back to the lowest point of the drip irrigation tube. This produces a negative pressure in certain regions of the drip irrigation tubes, thereby causing a suction effect at the outlet openings of the drip irrigation tubes. This suction effect can cause particles of dirt from the surrounding ground soil to be sucked in and to pass into the dosing region of the dosing elements. This can lead to the dosing element becoming blocked; the desired irrigation of the plants located in the region of this outlet opening is disrupted, which can lead to these plants becoming withered or even dying back.

Various types of drip irrigation tubes are known. In particular, in the case of thin-walled tubes dosing elements are inserted which are in the form of a disk or endless band, into which the structures of the dosing element are stamped. These drip irrigation tubes are pressed flatly in the "resting state". In the case of thicker-walled drip irrigation tubes which are laid e.g. in the ground soil, dosing elements which comprise a hollow-cylindrical shape are typically inserted. The dosing structures are formed in these hollow-cylindrical dosing elements.

In the case of all of these drip irrigation tubes, the described suction effect can occur in the region of the outlet openings for the reasons listed above.

The object of the present invention is to configure the drip irrigation tubes in such a manner that particles of dirt are prevented, where possible, from being able to penetrate into the dosing regions of the dosing elements through the outlet openings and from being able to pass into the dosing regions, whereby the corresponding dosing element could become blocked.

SUMMARY

In accordance with the invention, this object is achieved by virtue of the fact that the outlet openings are in the form of a slit and the edge regions of the slit are supported by supporting means in such a manner as to limit any bending of the edge regions of the slit towards the dosing elements.

The slit-shaped configuration of the outlet openings renders it possible during the irrigation procedure to bend the edge regions of the slit up in an outwards direction, so that the slit is opened and the water can issue out. In the case of the previously described suction effect which can occur in the region of the slit upon termination and interruption of the irrigation procedure by the pressure drop in the drip irrigation tube and the return flow of water, the edge regions of the slit would be bent inwards against the dosing element and form an opening. By means of the supporting elements installed in these edge regions of the slit such bending of these edge regions is avoided; the slit-shaped outlet opening thus remains closed, the penetration of particles of dirt into the dosing element can thereby be practically excluded and the function of the individual dosing elements in the drip irrigation tubes is ensured.

In an advantageous manner, the supporting means are integrally formed on the dosing elements, which permits simple production.

In an advantageous manner, the supporting means are formed from protrusions which are arranged along the slit on the dosing elements. By means of these protrusions, the respective edge region of the slit is supported against bending and water flow is ensured in an optimum fashion.

The supporting means can also be designed as ribs which are arranged longitudinally with respect to the respective slit on the dosing elements, thus enabling optimum support of the edge regions.

A further advantageous embodiment of the invention resides in the fact that each dosing element comprises a plurality of outlet regions. As a result, more water can be emitted in a simple manner via a dosing element.

In addition, a larger amount of water can also be emitted by virtue of the fact that more than one outlet opening in the form of a slit is provided for each outlet region in the tube walling.

In an advantageous manner, the dosing elements are in the form of a hollow cylinder which is advantageous particularly in the case of thicker-walled drip irrigation tubes.

In the case of thinner-walled drip irrigation tubes, the dosing elements can advantageously be in the form of a disk or band, whereby the drip irrigation tubes can be pressed flatly when not being used.

Depending on the configuration of the dosing elements and how the outlet regions can be arranged in these dosing elements, the slits can be oriented in parallel with the longitudinal axis of the drip irrigation tube or transversely with respect to the longitudinal axis of the drip irrigation tube.

BRIEF DESCRIPTION OF THE DRAWING FIGURES

Embodiments of the invention will be explained in greater detail hereinafter by way of example with reference to the accompanying drawing, in which:

FIG. 10 shows schematically and in a spatial representation a dosing element in accordance with a third embodiment of the invention;

FIG. 11 shows schematically the dosing element in accordance with FIG. 10 in the state when inserted into the drip irrigation tube;

DETAILED DESCRIPTION

Figure 1:
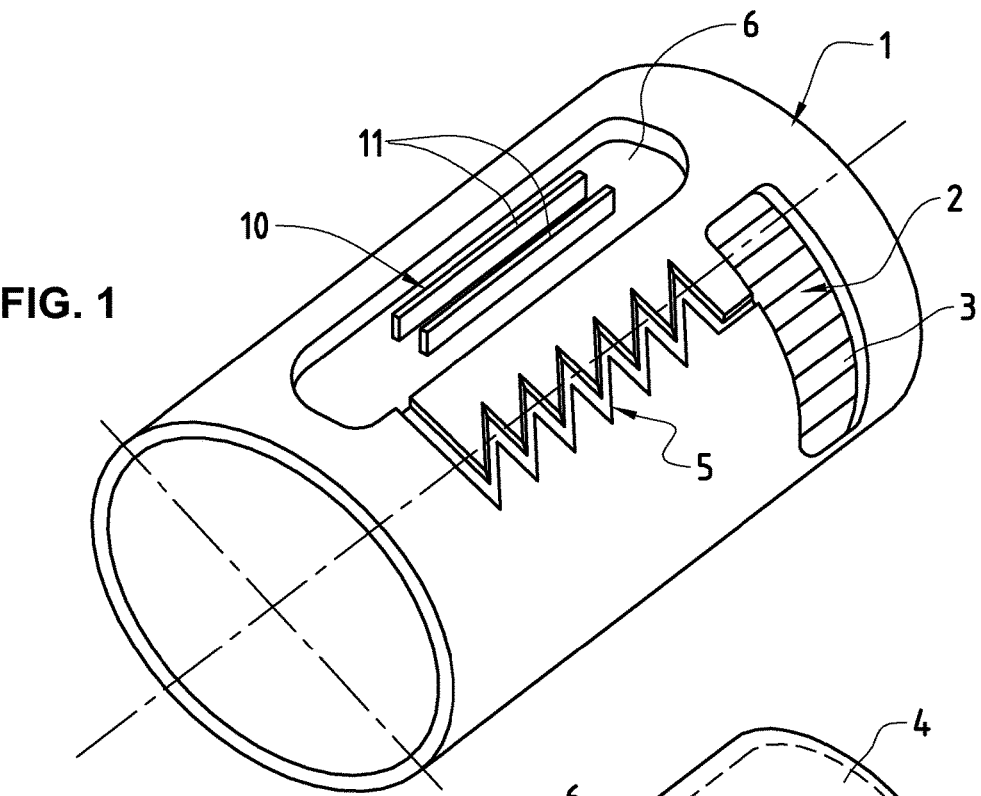
FIG. 1 shows schematically and in a spatial representation a dosing element in accordance with a first embodiment of the invention.
Figure 2:
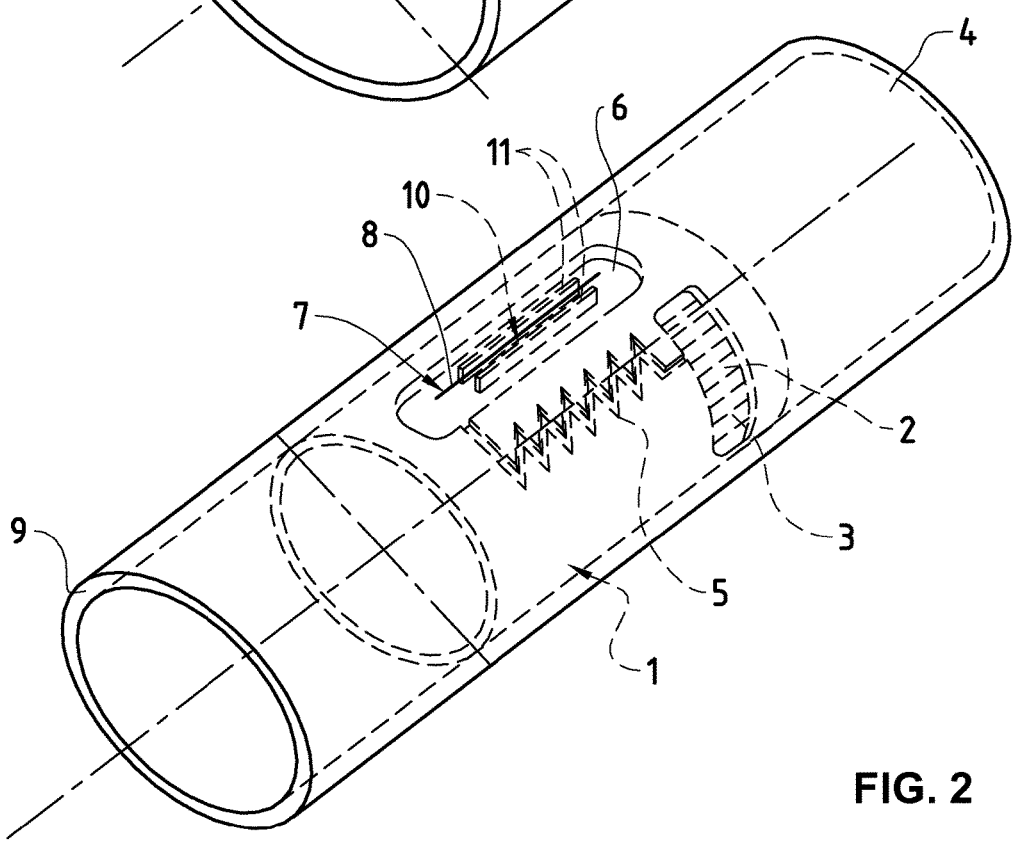
FIG. 2 shows in a spatial representation the dosing element in accordance with FIG. 1 in the state when inserted into the drip irrigation tube.

FIG. 1 and FIG. 2 illustrate a dosing element 1 which is in the form of a hollow cylinder. In a known manner, this dosing element 1 comprises an inlet region 2 which is equipped with a filter 3. Through this filter 3, the water passes from the drip irrigation tube 4 into the inlet region 2. This inlet region 2 is adjoined by a dosing region 5, in which the pressure of the through-flowing water is reduced in a known manner. The water passes from this dosing region 5 into the outlet region 6, out of which the water can be emitted dropwise into the surrounding area.

As can be seen in FIG. 2, the dosing element 1 is inserted in a known manner into the drip irrigation tube 4. The surfaces of the dosing element 1 are connected in a known manner to the walling 9 of the drip irrigation tube 4, in particular by welding, which is performed in a known manner during the procedure of producing the drip irrigation tube. The outlet opening is in the form of a slit 8 which extends at least over a partial region of the length of the outlet region 6.

As is apparent from FIGS. 1 and 2, the outlet region 6 of the dosing element 1 has supporting means 10 installed therein which in this first embodiment are designed as two ribs 11 which extend on both sides along the slit 8, and the function thereof will be described hereinafter.

Figure 3A:
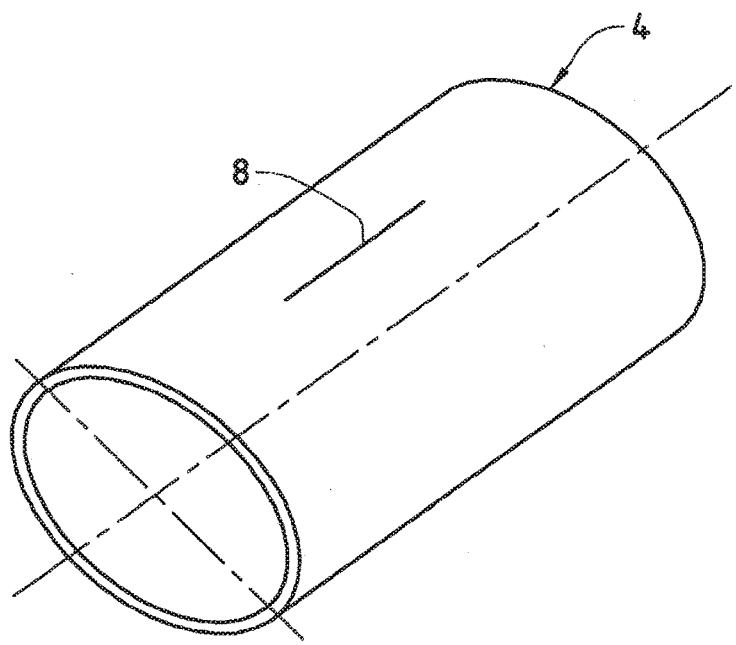
FIG. 3a and FIG. 3b show the representation of the outlet opening in the form of a slit of this first embodiment when the pressure within the drip irrigation tube equals 0.
Figure 3B:
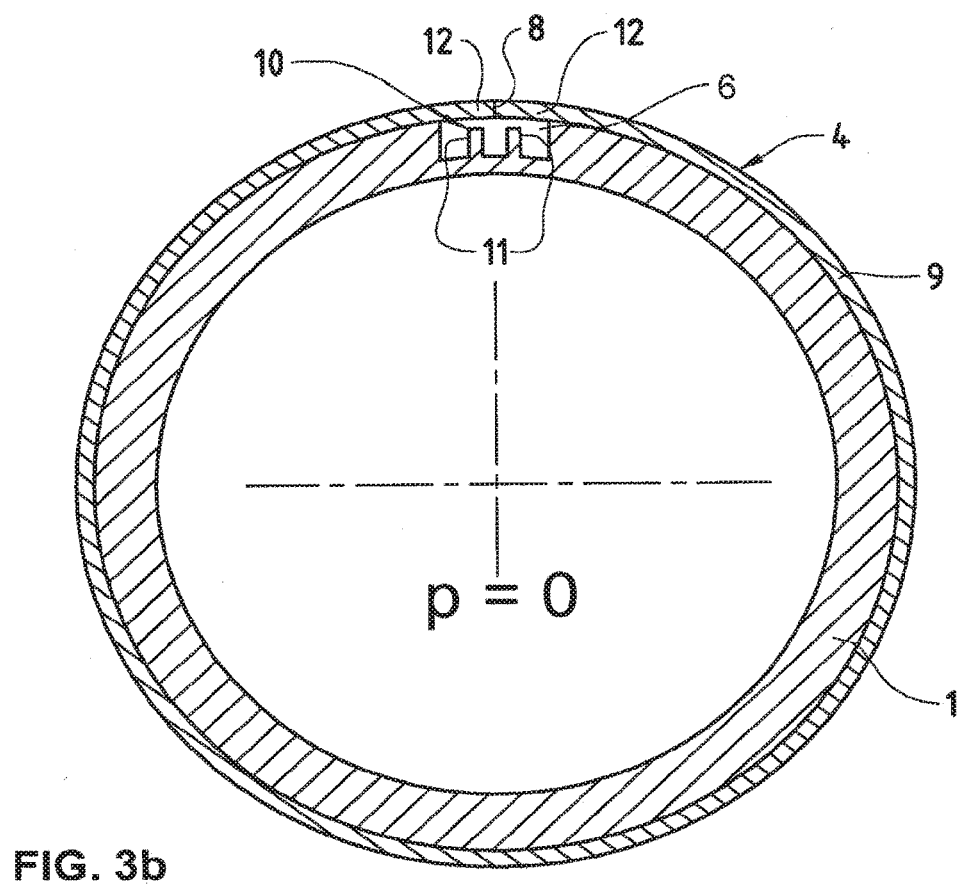

FIG. 3b shows the dosing element 1, which is in the form of a hollow cylinder inserted into the drip irrigation tube 4 and connected thereto. Also shown are the outlet region 6 of the dosing element 1 and the slit 8 installed in the walling 9. The supporting means are formed by the two ribs 11. These two ribs 11 are arranged underneath an edge region 12 of the slit 8. In this case, the pressure within the drip irrigation tube 4 equals 0, by reason of the elastic material from which this drip irrigation tube 4 is formed, e.g. polyethylene. The edge regions 12, which delimit the slit 8, lie one on top of the other. The slit 8 is closed. This can also be seen in FIG. 3a, which illustrates the drip irrigation tube 4 with the slit 8 installed therein. In FIG. 3b, it can be seen that the ribs 11 are slightly set back with respect to the surrounding surface of the dosing element 1. Therefore, when the dosing element 1 is connected to the walling 9 of the drip irrigation tube 4, an intermediate space remains between the ribs 11 and the edge regions 12 of the slit 8.

Figure 4A:
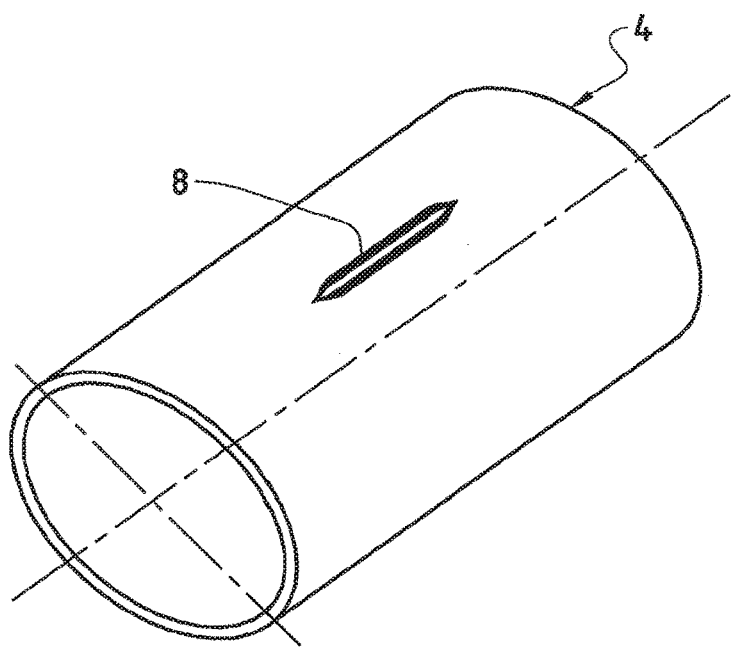
FIG. 4a and FIG. 4b show the representation of the outlet opening in the form of a slit of this first embodiment when the pressure within the drip irrigation tube is greater than 0.
Figure 4B:
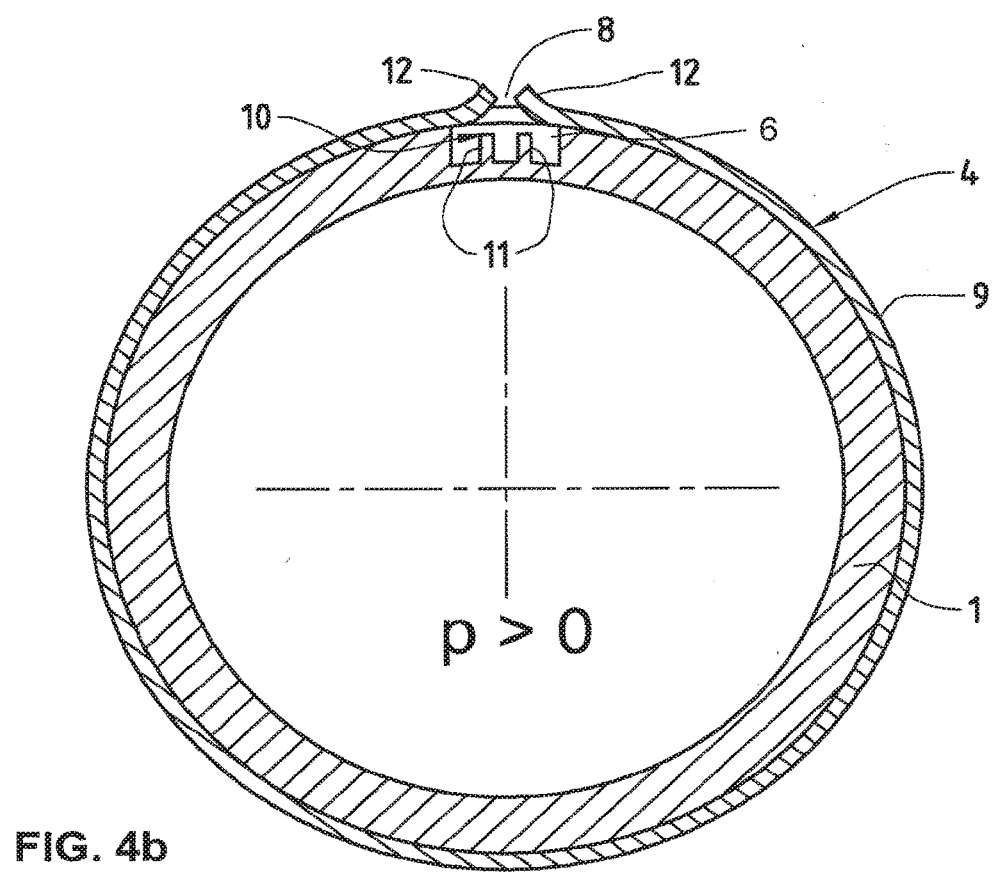

FIG. 4b illustrates the drip irrigation tube 4 with a dosing element 1 inserted therein, wherein the pressure within the drip irrigation tube 4 is greater than 0, which state is achieved during the irrigation procedure. A slightly higher pressure also prevails in the outlet region 6, whereby the two edge regions 12 of the slit 8 are raised outwards and form an opening. The slit 8 thus allows the water to issue out of the drip irrigation tube 4. This situation is also illustrated in FIG. 4a, in which the slit 8 installed in the drip irrigation tube 4 is open.

Figure 5A:
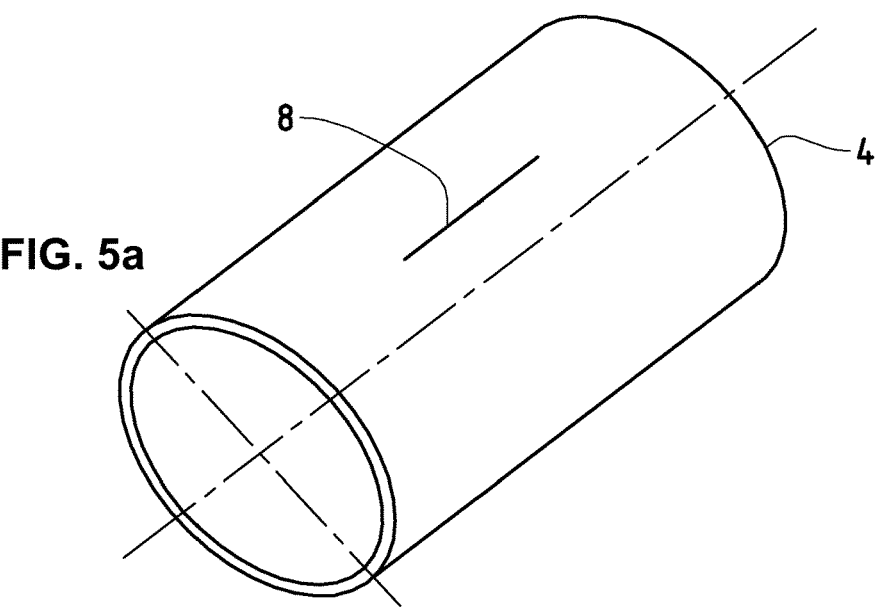
FIG. 5a and FIG. 5b show the representation of the outlet opening in the form of a slit of this first embodiment when the pressure within the drip irrigation tube is less than 0.
Figure 5B:
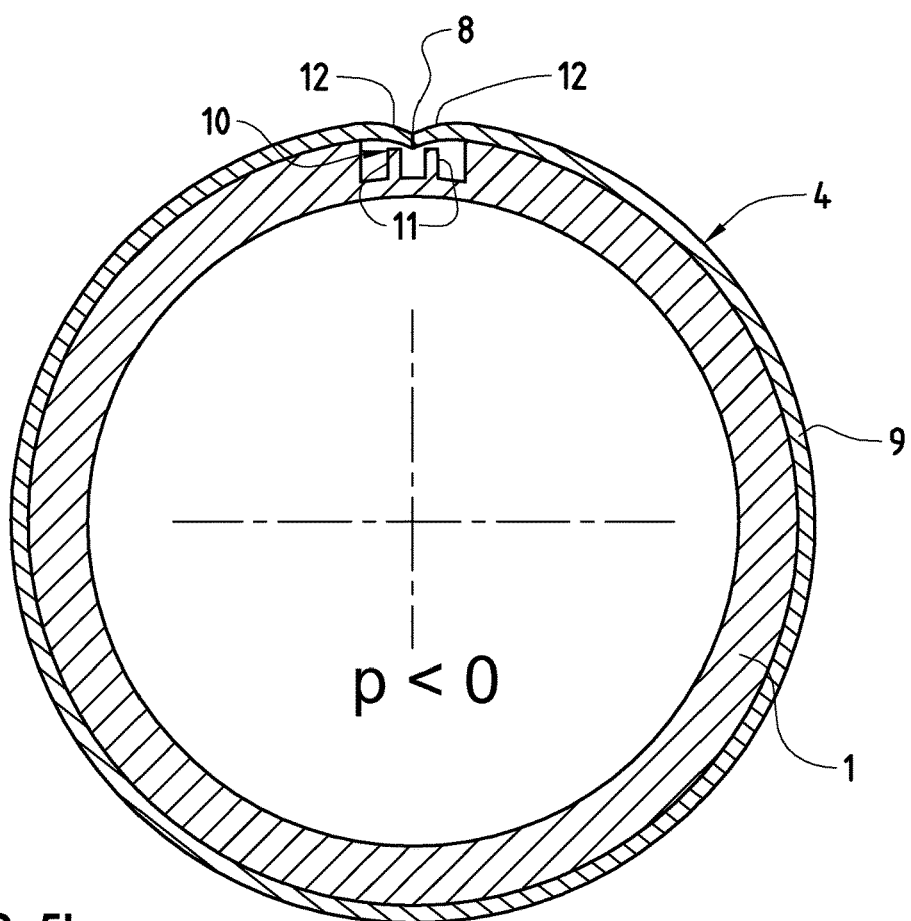

When the irrigation procedure is terminated, the pressure within the drip irrigation tube 4 subsides and becomes less than 0, as illustrated in FIG. 5b. In particular, when the drip irrigation tubes 4 are not aligned absolutely horizontally, which is typically the case, the residual water located in the drip irrigation tube 4 will run to the lowest point of the irrigation system, thus giving rise to the negative pressure within the drip irrigation tubes 4. This negative pressure can also be found in the outlet region 6. A suction effect thus occurs at the slit 8, and the edge regions 12 of the slit are bent inwards. The ribs 11, which form the supporting means 10, prevent excessive bending. The slit 8 thus also remains closed in this state. This prevents any particles of dirt from penetrating through the slit 8 into the outlet region 6, which particles of dirt would then land in the dosing region 5 (FIG. 1) and could block the flow of water through the dosing region 5.

Figure 6:
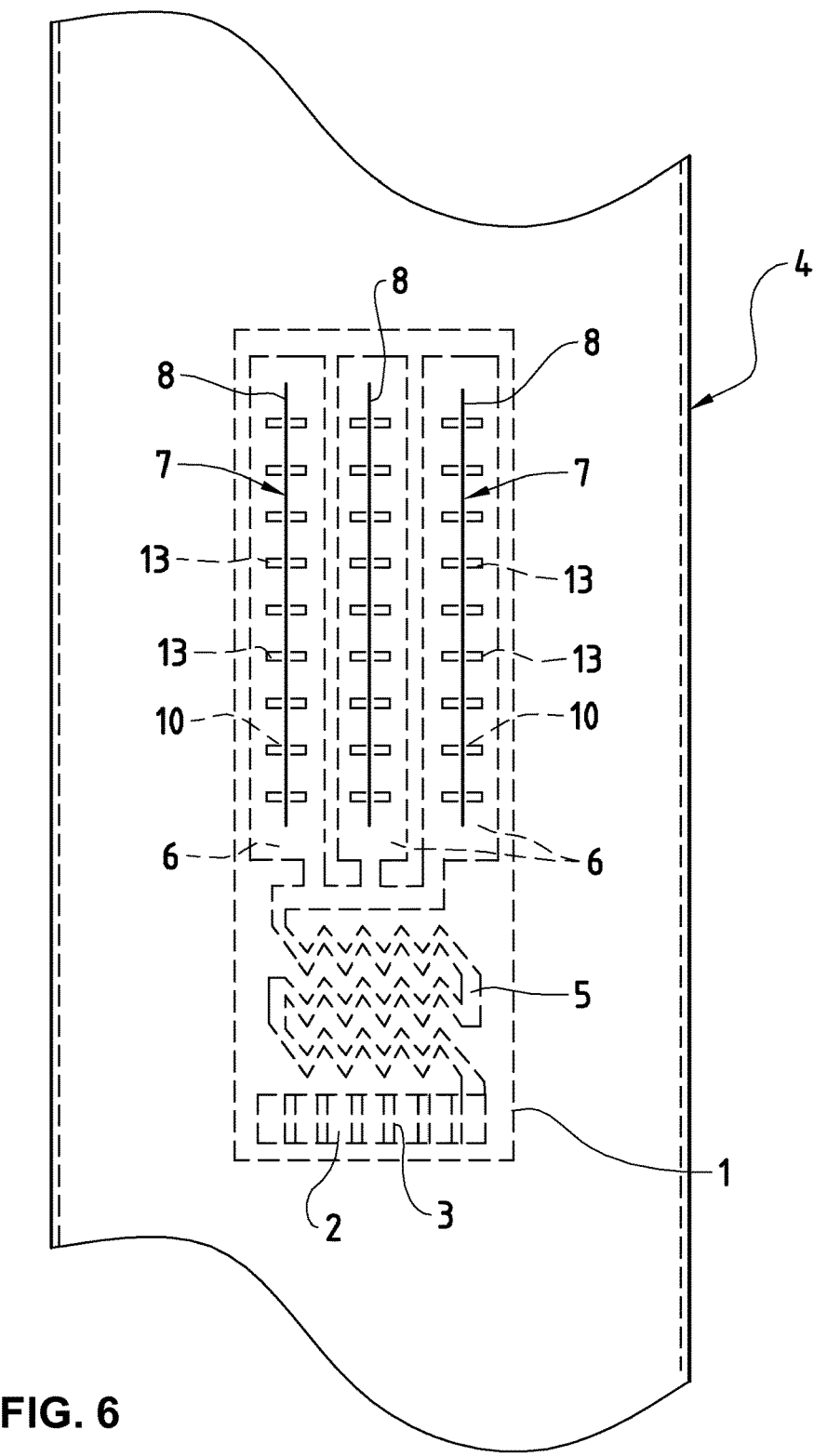
FIG. 6 shows a schematic representation of a second embodiment of the invention, in which the dosing element is designed as a disk and comprises three outlet openings in the form of a slit.

FIG. 6 shows an embodiment, in which the dosing element 1 which is inserted into the drip irrigation tube 4 is in the form of a disk. This dosing element comprises again an inlet region 2, a filter 3, a dosing region 5 and three outlet regions 6 arranged next to one another. In the longitudinal direction with respect to each outlet region, an outlet opening 7 in the form of a slit 8 is installed in the walling 9 of the drip irrigation tube 4. Installed in the region of these slits 8 are, again, supporting means 10 which in this case are designed as protrusions 13 which extend in each case transversely over the slit 8, and are spaced apart from one another longitudinally of the slit 8.

Figure 7A:
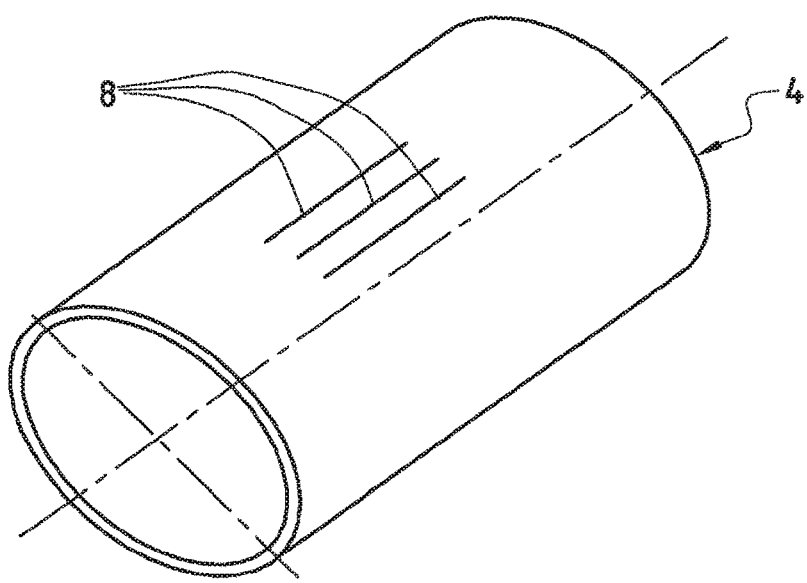
FIG. 7a and FIG. 7b show the representation of the outlet openings in the form of a slit of this second embodiment when the pressure within the drip irrigation tube equals 0.
Figure 7B:
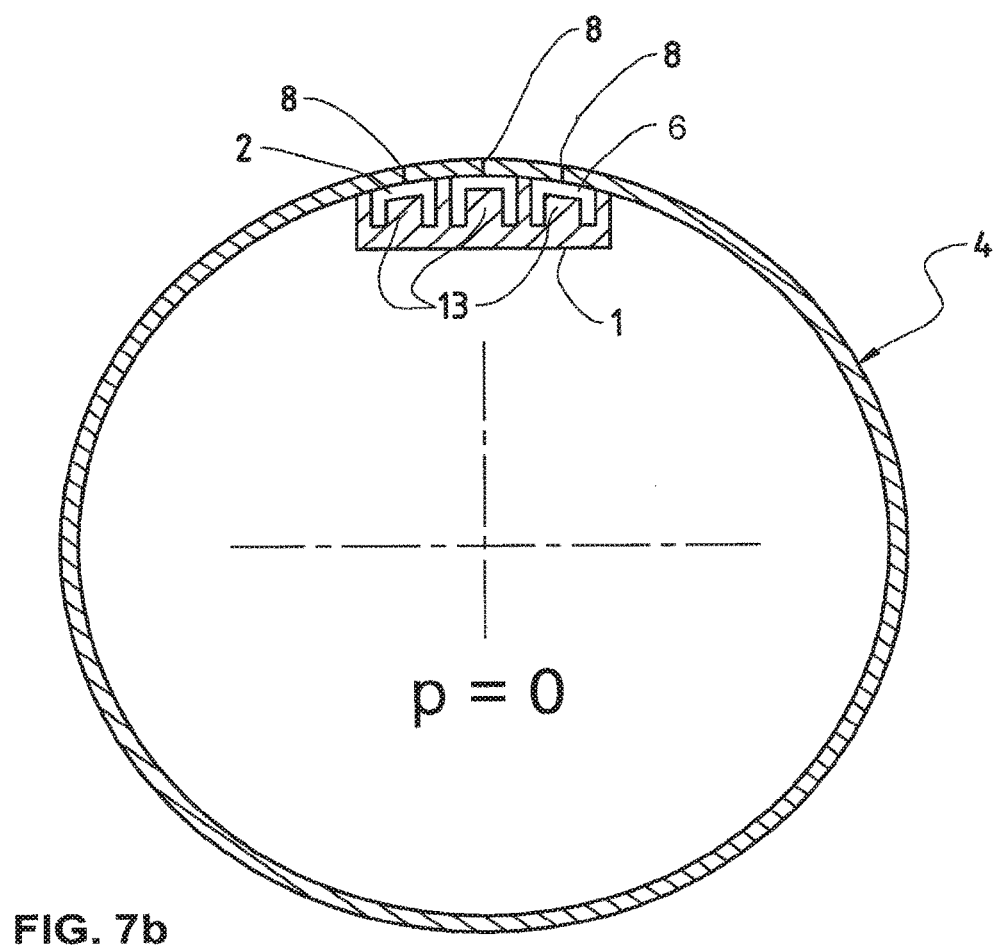

As can be seen in FIGS. 7a and 7b, the slits 8 are closed when the internal pressure in the drip irrigation tube 4 equals 0. As a result, no water issues out, and any contaminants are also prevented from being able to penetrate into the outlet regions 6.

Figure 8A:
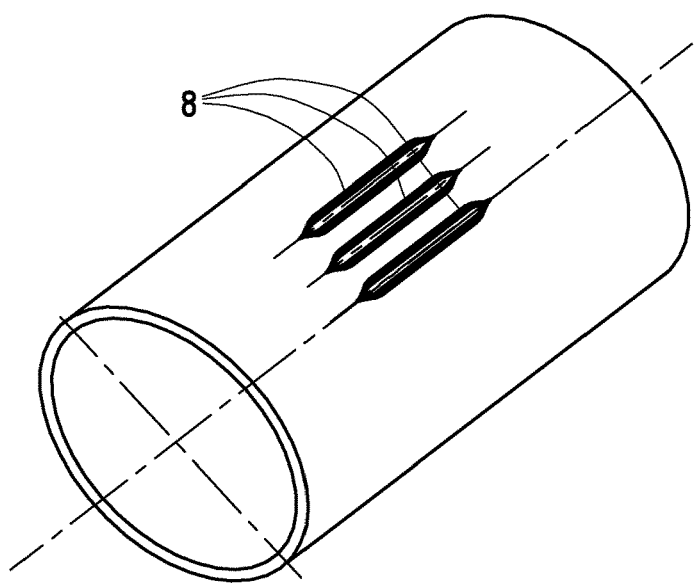
FIG. 8a and FIG. 8b show the representation of the outlet openings in the form of a slit of this second embodiment when the pressure within the drip irrigation tube is greater than 0.
Figure 8B:
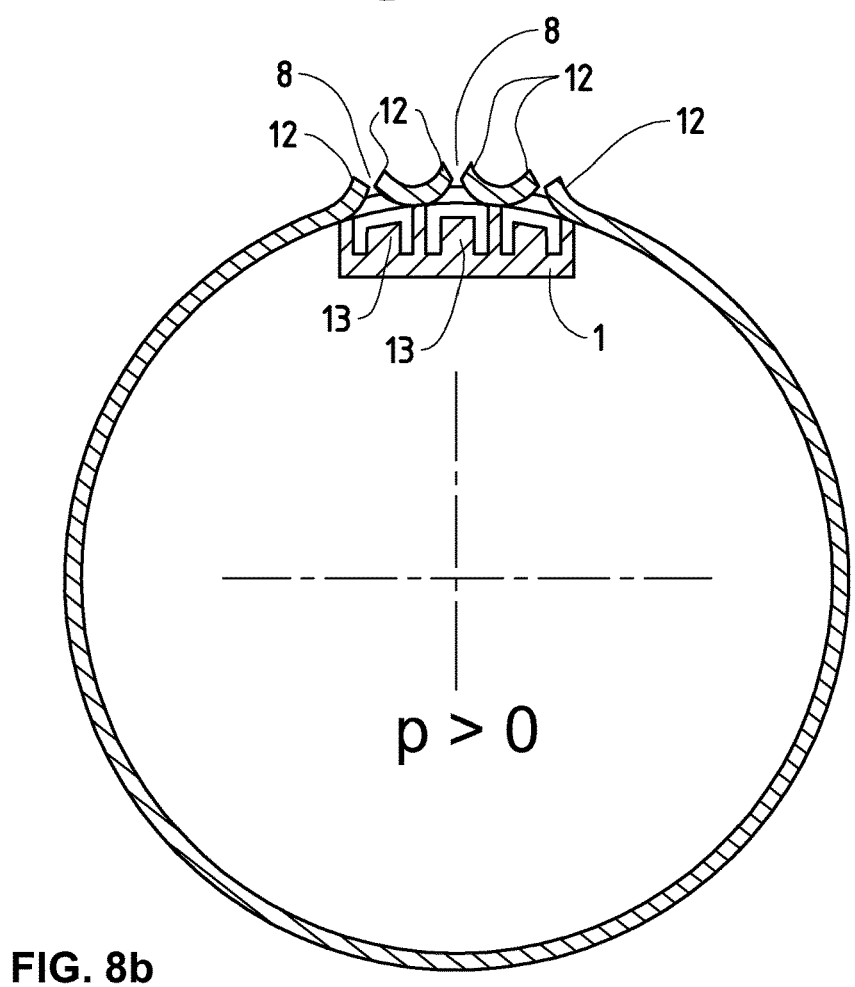
Figure 9A:
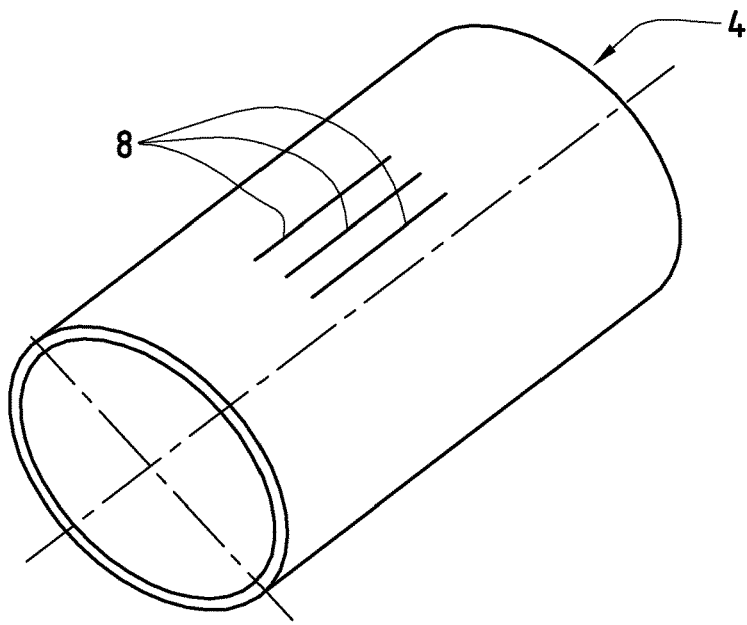
FIG. 9a and FIG. 9b show the representation of the outlet openings in the form of a slit of this second embodiment when the pressure within the drip irrigation tube is less than 0.
Figure 9B:
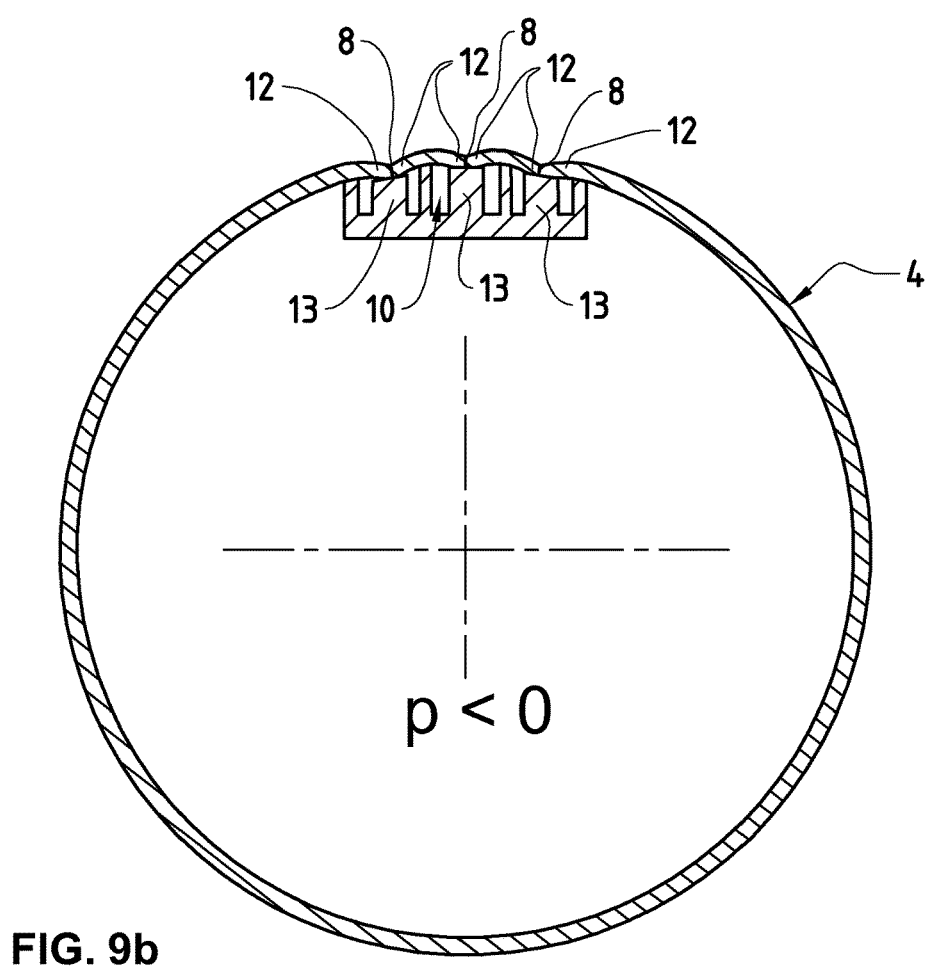

As can be seen in FIGS. 8a and 8b, during the irrigation procedure and when the pressure within the drip irrigation tube 4 is greater than 0 the edge regions 12 of the slits 8 are bent up outwards; the slits 8 are opened, the water can issue out through these slits 8.

When the irrigation procedure is completed and a negative pressure is produced within the drip irrigation tube 4, as previously explained, the edge regions 12 of the slits 8 are bent towards the dosing element 1; this bending occurs only until the edge regions 12 are supported on the protrusions 13, which protrusions 13 form the supporting means 10. The slits 8 are thereby closed, and any penetration of contaminants is avoided.

FIGS. 10 and 11 illustrate an embodiment, in which the dosing element 1 is formed from a hollow cylinder, which, as described previously, is inserted into the drip irrigation tube 4 and is connected thereto. This dosing element 1 comprises an inlet region 2, in which the filter 3 is arranged, through which the water is directed out of the interior of the drip irrigation tube via the dosing regions 5 into the outlet regions 6. These outlet regions 6 are designed as grooves 14 that extend over the entire circumference of the dosing element 1. Installed in these grooves 14 are two ribs 15, which extend in parallel and support the edge regions of the slits 8, which form the outlet openings 7, as will be seen at a later stage. In this case, the slits 8 are arranged transversely with respect to the longitudinal axis of the drip irrigation tube 4.

Figure 12A:
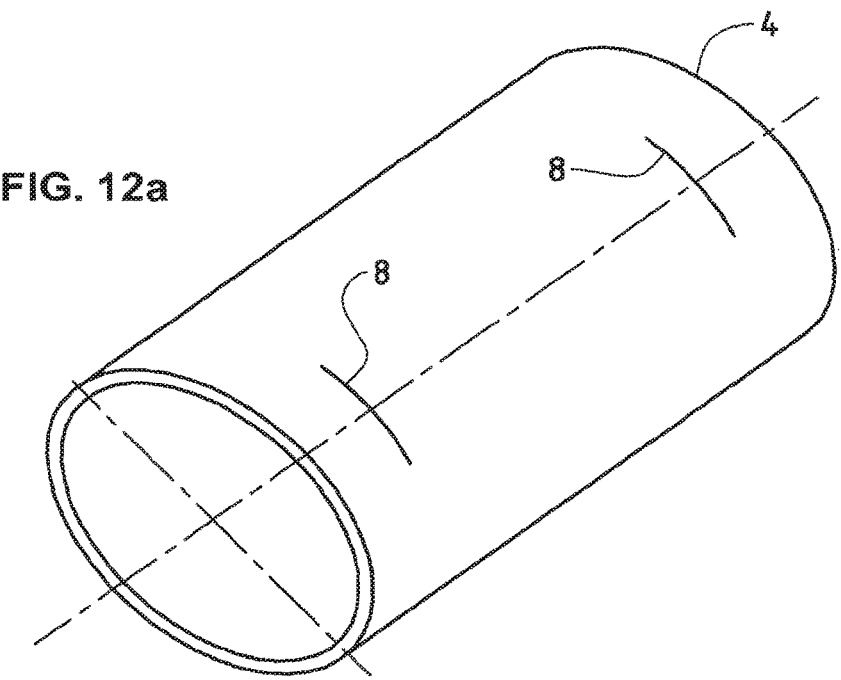
FIG. 12a and FIG. 12b show the representation of the outlet openings in the form of a slit of this third embodiment when the pressure within the drip irrigation tube equals 0.
Figure 12B:
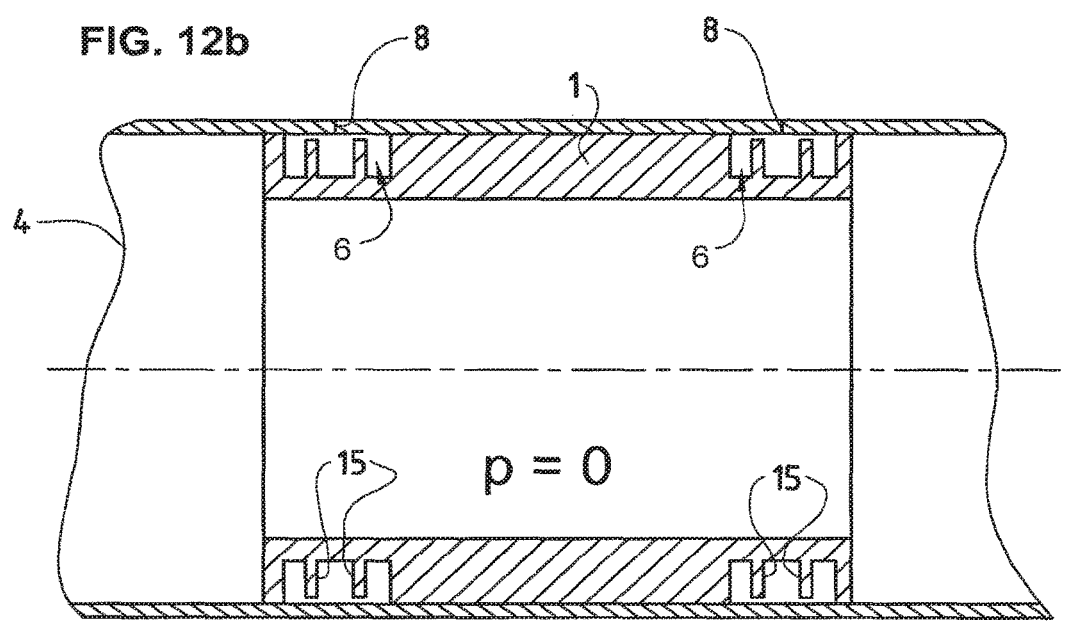
Figure 13A:
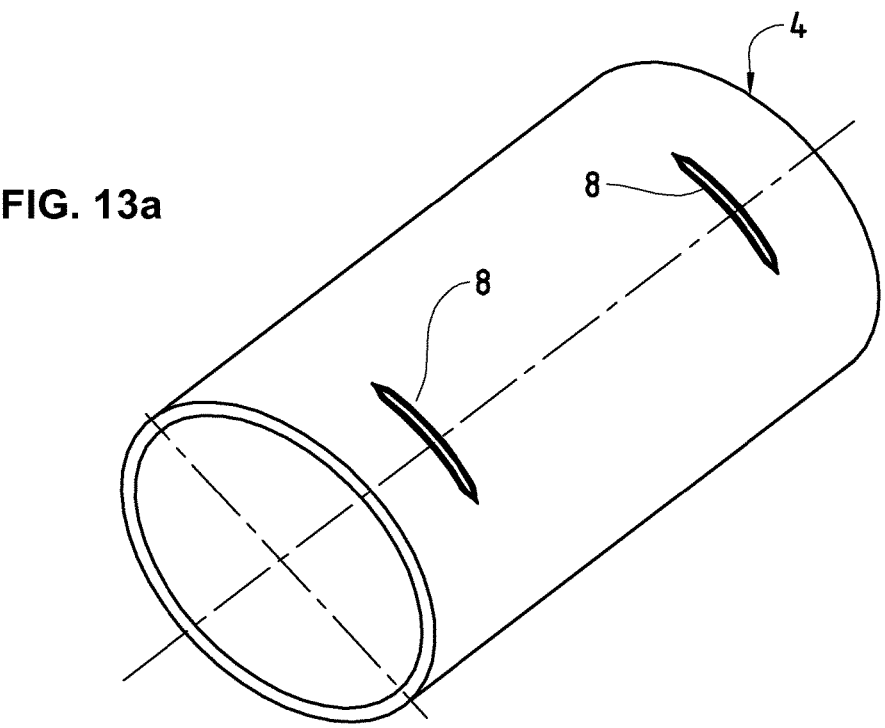
FIG. 13a and FIG. 13b show the representation of the outlet openings in the form of a slit of this third embodiment when the pressure within the drip irrigation tube is greater than 0.
Figure 13B:
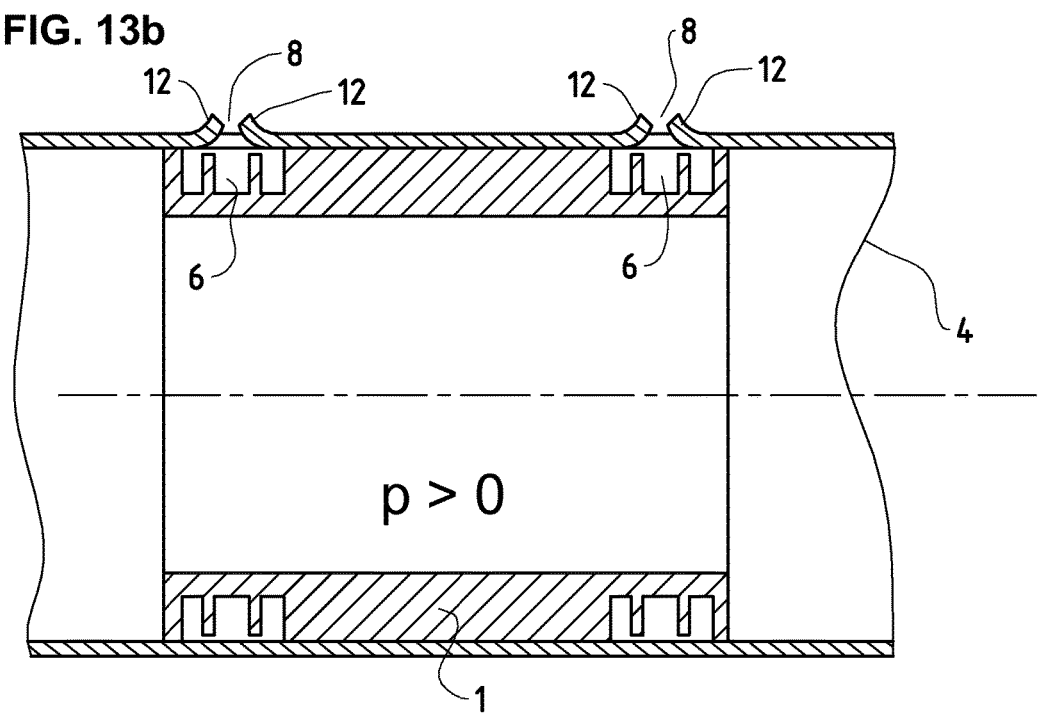

When the pressure within the drip irrigation tube 4 is 0, as illustrated in FIGS. 12a and 12b, the slits 8 are closed, as described previously. During the irrigation procedure, when the pressure within the drip irrigation tube 4 rises, as illustrated in FIGS. 13a and 13b, the edge regions 12 of the slits 8 are bent outwards, the water can issue out of the slits 8 for irrigation purposes.

Figure 14A:
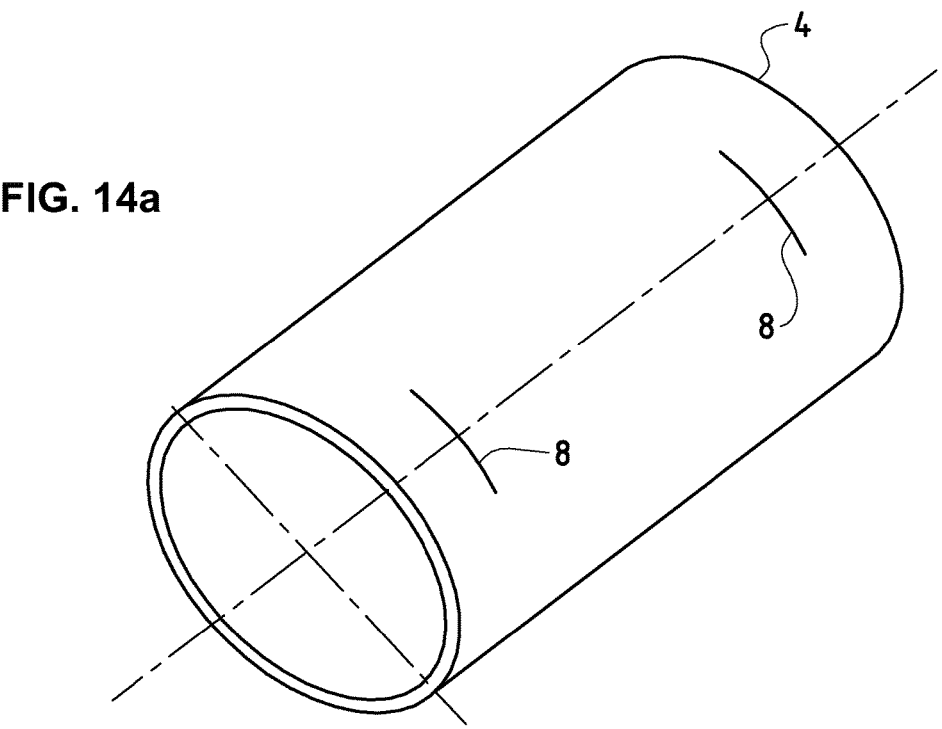
FIG. 14a and FIG. 14b show the representation of the outlet openings in the form of a slit of this third embodiment when the pressure within the drip irrigation tube is less than 0.
Figure 14B:
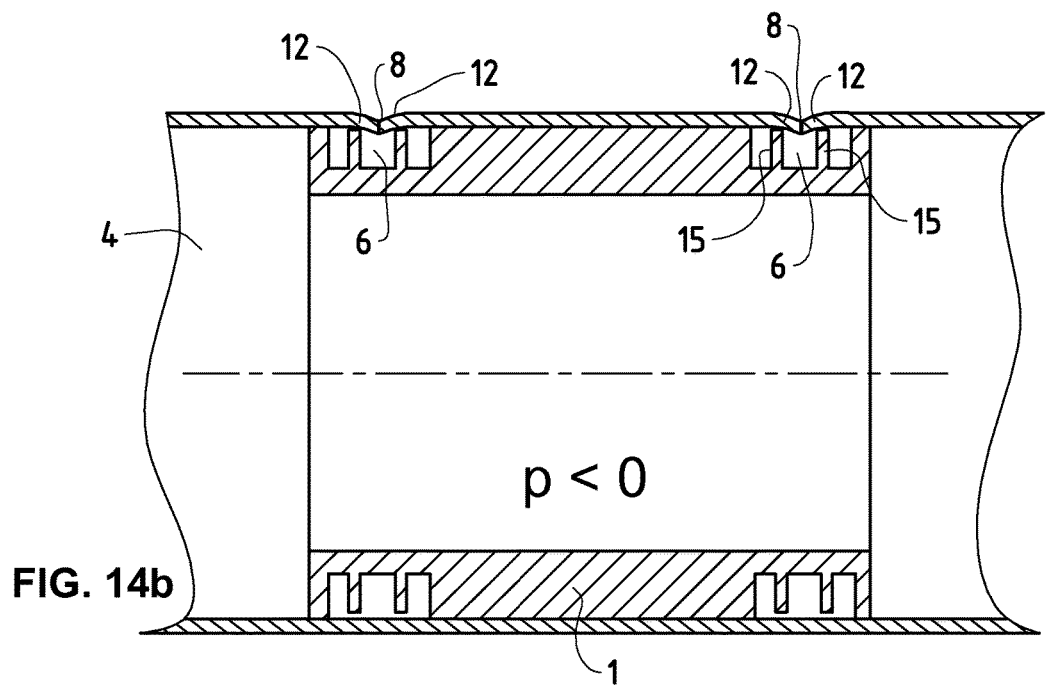

When the irrigation procedure is completed and the pressure in the drip irrigation tube becomes less than 0, as illustrated in FIGS. 14a and 14b, the suction effect causes the edge regions 12 of the slits 8 to bend inwards, this bending is limited by the ribs 15 so that in this situation the slits 8 are also closed and penetration of contaminants is avoided.

Figure 15:
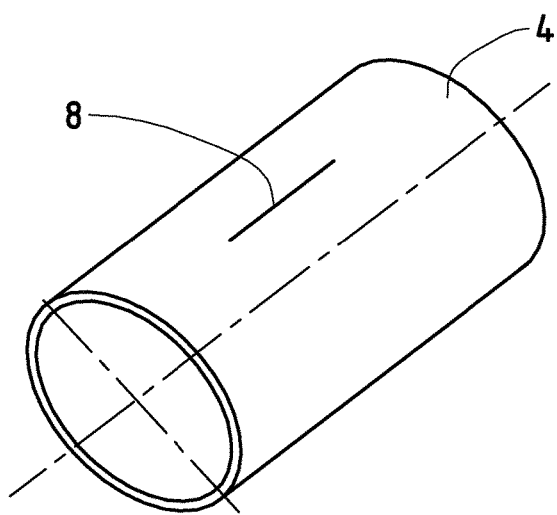
FIG. 15 to FIG. 17 show a fourth embodiment of the invention, in which the dosing element is in the form of a disk and an outlet opening is provided in the form of a slit.

FIG. 15 illustrates a drip irrigation tube 4, in which in each case a slit 8 which is oriented in the longitudinal direction of the tube is arranged for each dosing element.

Figure 16:
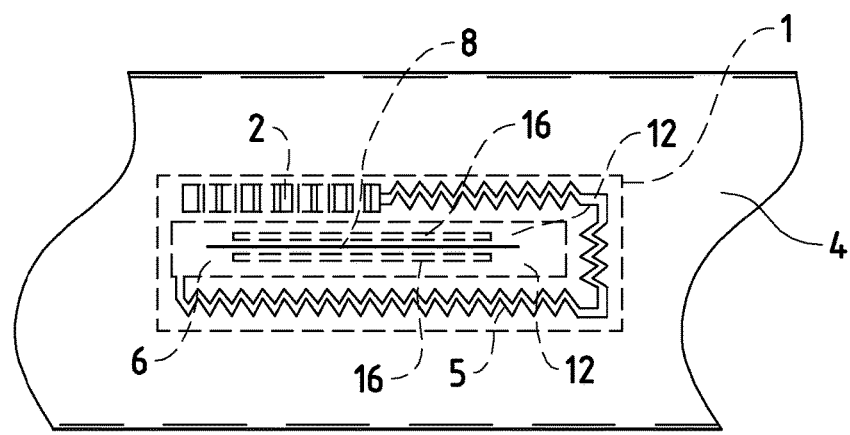

FIG. 16 illustrates that with respect to the slit 8 illustrated in FIG. 15, a dosing element 1 in the form of a disk is installed, having an inlet region 2, dosing region 5 and outlet region 6, wherein in each case two longitudinally extending ribs 16 are arranged along the slit 8, which ribs can support the edge regions 12 of the slit 8.

Figure 17:
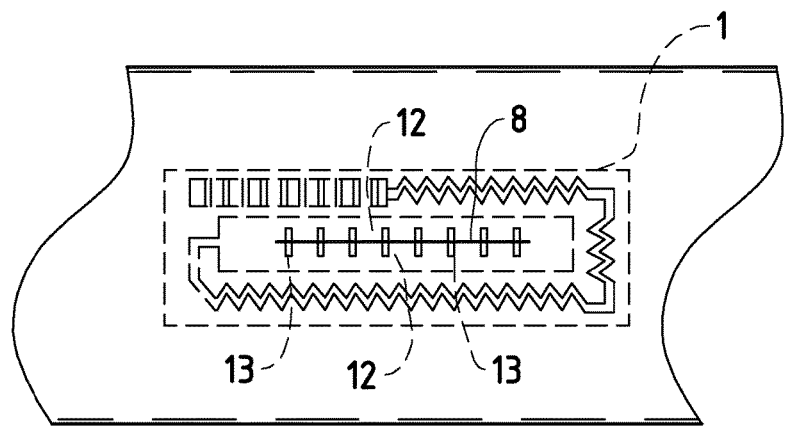

FIG. 17 illustrates the same arrangement as in FIG. 16; in this case the supporting means 10 in the dosing element 1 are designed as protrusions 13 which can support the edge regions 12 of the slit 8.

Figure 18:
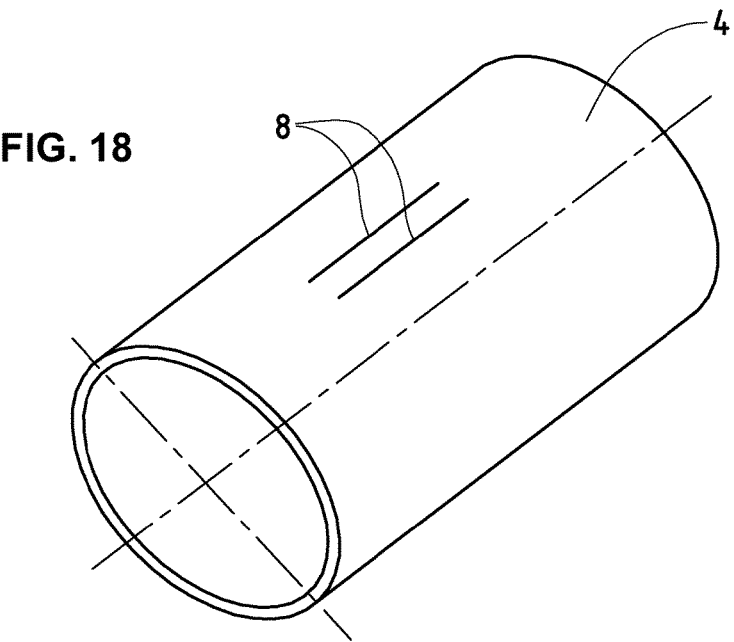
FIG. 18 and FIG. 19 show a fifth embodiment of the invention, in which the dosing element is designed as a disk and comprises two outlet openings in the form of a slit.
Figure 19:
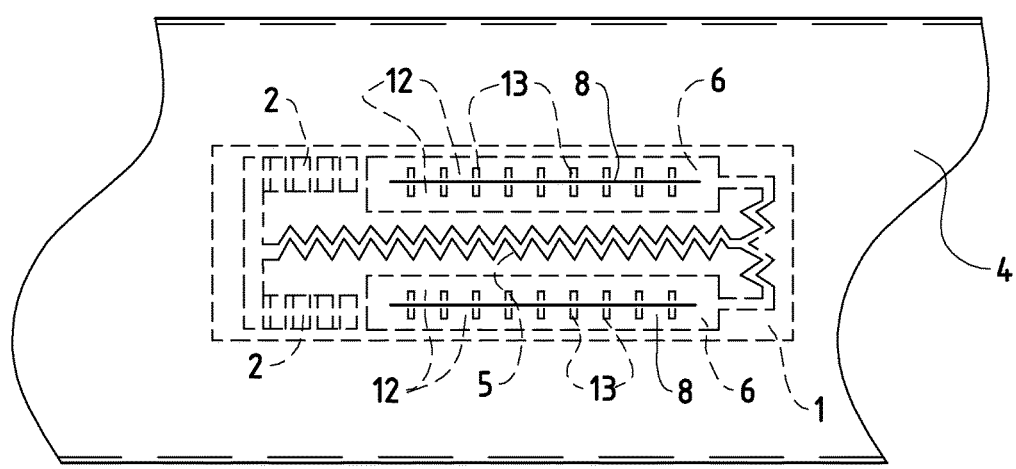

FIGS. 18 and 19 illustrate an embodiment, in which the dosing element 1 comprises two inlet regions 2, a dosing region 5 and two outlet regions 6, wherein the outlet regions 6 are oriented in parallel with one another and in the longitudinal direction of the drip irrigation tube 4. The slits 8 are arranged in the region of the outlet regions 6; the edge regions 12 of these slits 8 are supported by protrusions 13 which are installed longitudinally of the slits 8 in the dosing element 1.

Figure 20:
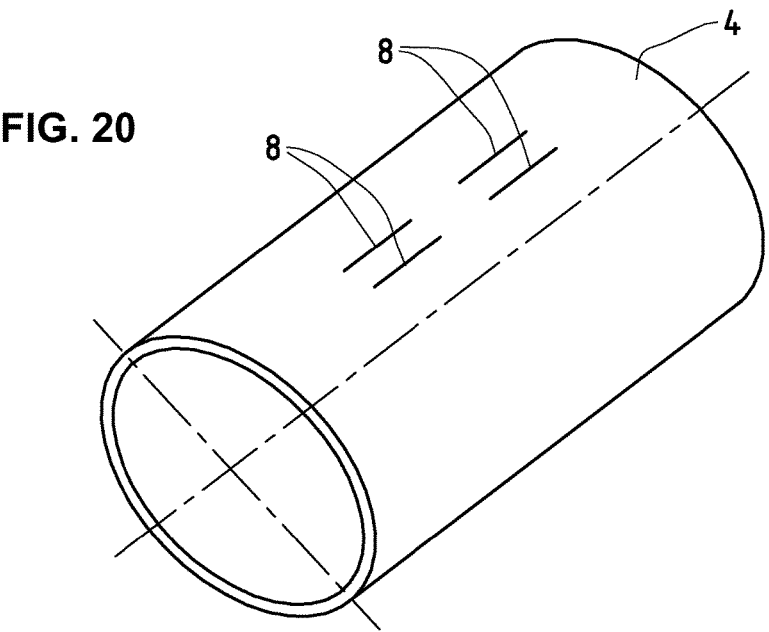
FIG. 20 and FIG. 21 show a sixth embodiment of the invention, in which the dosing element is designed as a disk having four outlet openings in the form of a slit.
Figure 21:
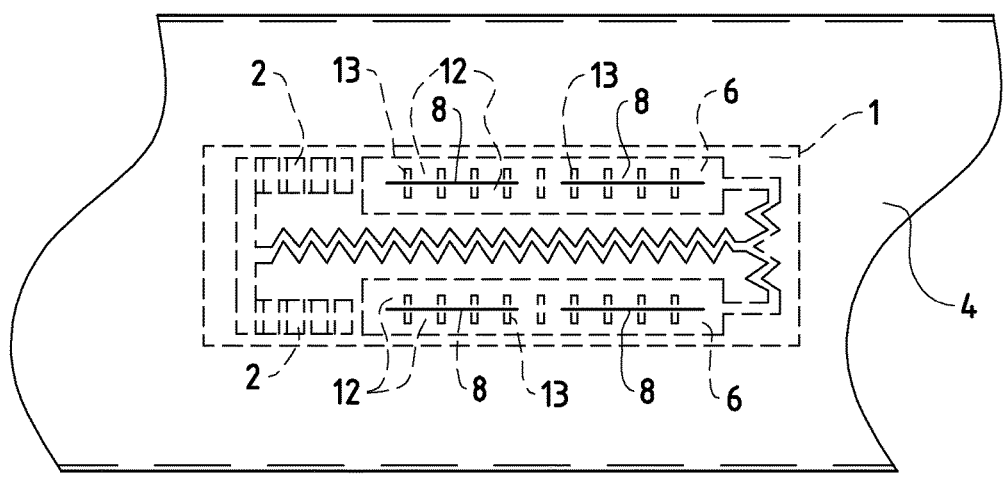

FIGS. 20 and 21 illustrate an embodiment, in which four slits 8 are arranged for each dosing element 1. The dosing element 1 comprises two inlet regions 2, from which the water passes into a centrally arranged dosing region 5. The water passes via a branch into the two outlet regions 6 which are aligned in parallel with one another. In each of these outlet regions 6 two slits 8 whose edge regions 12 are supported by protrusions 13 are installed in each case in the walling 9 of the drip irrigation tube 4.

These previously described embodiments show that the slits which form the outlet opening remain closed by means of supporting means when a negative pressure occurs within the tube which prevents contaminants from being able to penetrate into the dosing elements and block same. Moreover, these embodiments show that different dosing elements can be used, so that the number of slits, through which the water can issue out, as well as the orientation thereof can be configured in practically any manner, depending upon the requirements placed upon the irrigation system.

The invention claimed is:

1. A drip irrigation tube, comprising:
   a drip irrigation tube wall having at least one outlet opening slit; and
   at least one dosing element connected to an inner surface of the drip irrigation tube wall at a location of the at least one outlet opening slit, wherein the at least one dosing element comprises:
      an inlet region, through which water passes from the drip irrigation tube into the at least one dosing element;
      a dosing region in fluid communication with the inlet region, wherein the dosing region comprises a labyrinthine flow passage, wherein the dosing region is configured to reduce a pressure of the water flowing into it from the inlet region;
      an outlet region in fluid communication with the dosing region and located around the at least one outlet opening slit in the drip irrigation tube wall; and
      a plurality of rectangularly shaped support members in the outlet region positioned parallel to each other and configured to support edge regions of the at least one outlet opening slit to limit inward bending of the edge regions toward the at least one dosing element such that the edge regions remain closed during inward bending to avoid contaminant penetration through the at least one outlet opening slit,
   wherein the water that flows into the outlet region from the dosing region issues out of the drip irrigation tube via the at least one outlet opening slit in the drip irrigation tube wall.

2. A drip irrigation tube as in claim 1, wherein the plurality of rectangularly shaped support members are integrally formed on the at least one dosing element.

3. A drip irrigation tube as in claim 1, wherein the plurality of rectangularly shaped support members comprise multiple protrusions arranged along the at least one outlet opening slit on the at least one dosing element.

4. A drip irrigation tube as in claim 1, wherein the plurality of rectangularly shaped support members comprise multiple ribs arranged longitudinally along the at least one outlet opening slit on the at least one dosing element.

5. A drip irrigation tube as in claim 1, wherein the at least one outlet opening slit comprises multiple outlet opening slits, and wherein the outlet region comprises multiple outlet regions to accommodate multiple outlet opening slits.

6. A drip irrigation tube as in claim 1, wherein the at least one dosing element is shaped as a hollow cylinder.

7. A drip irrigation tube as in claim 1, wherein the at least one dosing element has a shape selected from the group consisting of a disk and a band.

8. A drip irrigation as in claim 1, wherein the at least one outlet opening slit is oriented in parallel with respect to a longitudinal axis of the drip irrigation tube.

9. A drip irrigation tube as in claim 1, wherein the at least one outlet opening slit is oriented transversely with respect to a longitudinal axis of the drip irrigation tube.

* * * * *